(12) United States Patent
Yanagida et al.

(10) Patent No.: US 6,869,546 B1
(45) Date of Patent: Mar. 22, 2005

(54) CARBON MATERIALS, ELECTRODES AND NONAQUEOUS ELECTROLYTE SECONDARY CELLS

(75) Inventors: Katsunori Yanagida, Itami (JP); Atsushi Yanai, Yono (JP); Takeshi Maeda, Tsukuba (JP); Yoshinori Kida, Hirakata (JP); Atsuhiro Funahashi, Suita (JP); Toshiyuki Nohma, Hirakata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/576,211

(22) Filed: May 23, 2000

(30) Foreign Application Priority Data

May 25, 1999 (JP) ............................................ 11-145143
Feb. 10, 2000 (JP) ...................................... 2000-033801

(51) Int. Cl.$^7$ ............................. H01B 1/04; H01M 4/58; C01B 31/00
(52) U.S. Cl. ............... 252/502; 429/231.8; 429/231.95; 423/414
(58) Field of Search ......................... 429/231.8, 231.95, 429/218.1; 252/502; 423/414, 445 R; 425/408

(56) References Cited

U.S. PATENT DOCUMENTS

| | | | |
|---|---|---|---|
| 5,498,493 A | | 3/1996 | Dahn et al. .................. 429/218 |
| 5,698,341 A | | 12/1997 | Tamaki et al. ............... 429/218 |
| 5,702,845 A | * | 12/1997 | Kawakami et al. .......... 429/224 |
| 5,795,678 A | * | 8/1998 | Takami et al. ............... 429/218 |
| 6,103,423 A | * | 8/2000 | Itoh et al. .................. 429/231.8 |
| 6,156,432 A | * | 12/2000 | Mabuchi et al. ............. 428/408 |
| 6,194,067 B1 | * | 2/2001 | Hamada et al. .............. 428/367 |
| 6,395,427 B1 | * | 5/2002 | Sheem et al. ............. 429/231.8 |

FOREIGN PATENT DOCUMENTS

| | | | | |
|---|---|---|---|---|
| EP | 0 916 618 A1 | | 8/1997 | |
| JP | 3-165463 | * | 7/1991 | |
| JP | 5-290843 | * | 11/1993 | |
| JP | 9-306495 | * | 11/1997 | |
| JP | 10-36108 | | 2/1998 | |
| JP | 10-223223 | * | 8/1998 | ............ H01M/4/58 |

* cited by examiner

Primary Examiner—Patrick Ryan
Assistant Examiner—Julian Mercado
(74) Attorney, Agent, or Firm—Kubovcik & Kubovcik (57) ABSTRACT

For us in nonaqueous electrolyte secondary cells, the invention provides an electrode which comprises a first carbon material serving as a core material, and a second carbon material coating the first carbon material over the surface thereof and containing boron. When used as an active substance for negative electrode to provide a nonaqueous electrolyte secondary cell, the electrode diminishes the reduction of the cell capacity that would result if the cell is allowed to store, giving improved storage characteristics to the cell.

74 Claims, 2 Drawing Sheets

CARBON MATERIALS, ELECTRODES AND NONAQUEOUS ELECTROLYTE SECONDARY CELLS

FIELD OF THE INVENTION

The present invention relates to carbon materials suitable for use as negative electrode materials for nonaqueous electrolyte secondary cells, electrodes comprising such a carbon material and nonaqueous electrolytes secondary cells incorporating the electrode.

BACKGROUND OF THE INVENTION

Carbon materials such as graphite and coke are already proposed for use as negative electrode materials for nonaqueous electrolyte secondary cells. Among these materials, graphite exhibits a very low discharge potential in the vicinity of the potential of metallic lithium, affording nonaqueous electrolyte secondary cells of high energy density and is therefore one of the materials widely used. However, the conventional secondary cells wherein graphite is used for the negative electrode have the problem that when the cell is allowed to store for a long period of time, the lithium in the carbon material reacts with the electrolyte, causing self-discharge to result in a lower cell capacity.

To overcome this problem, JP-A No. 36108/1998, for example, proposes a nonaqueous electrolyte secondary cell having incorporated therein a graphite material coated with a carbon material of low crystallinity. The proposed cell nevertheless still has the problem of becoming lower in capacity when left storing.

SUMMARY OF THE INVENTION

An object of the present invention which has been accomplished in view of the foregoing drawbacks of the prior art is to provide a carbon material which, when used as the active substance of negative electrodes for nonaqueous electrolyte secondary cells, diminishes the reduction of the cell capacity that would result if the cell is allowed to store, the carbon material thus being suitable to give improved storage characteristics to the cell.

Another object of the invention is to provide an electrode which, when used as the negative electrode for a nonaqueous electrolyte secondary cell, diminishes the reduction of the cell capacity that would result if the cell is allowed to store, the electrode thus being suitable to give improved storage characteristics to the cell.

Still another object of the invention is to provide a nonaqueous electrolyte secondary cell which is diminished in the reduction of its capacity that would result when allowed to store and which is improved in storage characteristics.

The present invention provides as a first feature thereof a carbon material which is characterized in that the carbon material comprises a first carbon material serving as a core material, and a second carbon material coating the first carbon material over the surface thereof, the second carbon material containing boron (B). In the case where the carbon material is used as a negative electrode material for nonaqueous electrolyte secondary cells, the cell exhibits a small self-discharge rate when allowed to store and is given improved storage characteristics. This is thought attributable to a diminished reaction between lithium in the carbon material and the electrolyte due to the use of the boron-containing second carbon material in the nonaqueous electrolyte secondary cell.

The carbon material of the first feature of the invention is further characterized in that the first carbon material contains no boron. In the case where this carbon material is used as the negative electrode active substance of the nonaqueous electrolyte secondary cell, the self-discharge rate becomes further smaller to give improved storage characteristics to the cell.

With the carbon material of the first feature of the invention, the first carbon material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method. Preferably, the first carbon material is at least 3.35 Å to not greater than 3.36 Å in the spacing $d_{002}$ between (002) planes thereof and is at least 1000 Å in the size Lc of crystallites in the direction of c-axis thereof as determined by the X-ray wide-angle diffraction method. In this case, the secondary cell can be given an increased discharge capacity.

Further with the carbon material of the first feature of the invention, the second carbon material is at least 3.37 Å to not greater than 3.90 Å in the spacing $d_{002}$ between (002) planes thereof as determined by the X-ray wide-angle diffraction method.

With the carbon material of the first feature of the invention, the second carbon material contains at least 1 wt. % to up to 15 wt. % of boron, preferably at least 5 wt. % to up to 10 wt. % of boron.

Further with the carbon material of the first feature of the invention, the amount of the second carbon material is at least 1 wt. % to up to 20 wt. % based on the combined amount of the first carbon material and the second carbon material, preferably at least 5 wt. % to up to 10 wt. % based on the combined amount of the first carbon material and the second carbon material.

Further with the carbon material of the first feature of the invention, the second carbon material contains at least 0.01 wt. % to up to 3 wt. % of boron based on the combined amount of the first carbon material and the second carbon material, preferably at least 0.25 wt. % to up to 1 wt. % of boron based on the combined amount of the first carbon material and the second carbon material.

The present invention provides as a second feature thereof a carbon material which is characterized in that the carbon material comprises a first carbon material serving as a core material, and a second carbon material coating the first carbon material over the surface thereof, the second carbon material containing boron (B) and nitrogen (N).

In the case where the carbon material is used as a negative electrode material for nonaqueous electrolyte secondary cells, the cell exhibits a small self-discharge rate when allowed to store and is given improved storage characteristics. This is thought attributable to a diminished reaction between lithium in the carbon material and the electrolyte due to the use of the boron- and nitrogen-containing second carbon material in the nonaqueous electrolyte secondary cell.

The carbon material of the second feature of the invention is further characterized in that the first carbon material contains no boron and no nitrogen. In the case where this carbon material is used as the negative electrode active substance of the nonaqueous electrolyte secondary cell, the self-discharge rate becomes further smaller to give improved storage characteristics to the cell.

With the carbon material of the second feature of the invention, the first carbon material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method. Preferably, the first carbon material is at least 3.35 Å to not greater than 3.36 Å in the spacing $d_{002}$ between (002) planes thereof and is at least 1000 Å in the size Lc of crystallites in the direction of c-axis thereof as determined by the X-ray wide-angle diffraction method. In this case, the secondary cell can be given an increased discharge capacity.

With the carbon material of the second feature of the invention, the second carbon material is at least 3.37 Å to not greater than 3.90 Å in the spacing $d_{002}$ between (002) planes thereof as determined by the X-ray wide-angle diffraction method.

Further with the carbon material of the second feature of the invention, the second carbon material contains at least 1 wt. % to up to 15 wt. % of boron, preferably at least 5 wt. % to up to 10 wt. % of boron.

Further with the carbon material of the second feature of the invention, the second carbon material contains at least 1 wt. % to up to 10 wt. % of nitrogen, preferably at least 3 wt. % to up to 5 wt. % of nitrogen.

Further with the carbon material of the second feature of the invention, the amount of the second carbon material is at least 1 wt. % to up to 20 wt. % based on the combined amount of the first carbon material and the second carbon material, preferably at least 5 wt. % to up to 15 wt. % based on the combined amount of the first carbon material and the second carbon material.

Further with the carbon material of the second feature of the invention, the second carbon material contains at least 0.01 wt. % to up to 3 wt. % of boron based on the combined amount of the first carbon material and the second carbon material, preferably at least 0.25 wt. % to up to 1.5 wt. % of boron based on the combined amount of the first carbon material and the second carbon material.

Further with the carbon material of the second feature of the invention, the second carbon material contains at least 0.01 wt. % to up to 2 wt. % of nitrogen based on the combined amount of the first carbon material and the second carbon material, preferably at least 0.15 wt. % to up to 0.75 wt. % of nitrogen based on the combined amount of the first carbon material and the second carbon material.

The present invention further provides an electrode which is characterized in that the carbon material of the first or second feature of the invention is used as an active substance thereof. In the case where the electrode is used as the negative electrode material of a nonaqueous electrolyte secondary cell, the cell exhibits a small self-discharge rate when allowed to store and is given improved storage characteristics.

The present invention further provides a nonaqueous electrolyte secondary cell which is characterized in that the electrode of the invention described is used as its negative electrode. The nonaqueous electrolyte secondary cell exhibits a small self-discharge rate when allowed to store and is improved in storage characteristics.

DETAILED DESCRIPTION OF EMBODIMENTS

A. First Feature of the Invention as Embodied

A detailed description will be given of embodiments of first feature of the invention.

Preparation of Carbon Material Having a Surface Coating of Boron-containing Carbon Material A carbon material having a surface coating of boron-containing carbon material can be prepared by dipping a first carbon material serving as a core material in an organic compound which can be carbonized and has a boron compound added thereto, separating the material from the compound and thereafter carbonizing the material at a temperature of at least 500° C. to up to 1800° C., preferably at least 700° C. to up to 1400° C.

Examples of useful organic compounds are pitch and tar, and solutions of phenol-formaldehyde resin, furfuryl alcohol resin, carbon black, vinylidene chloride, cellulose or the like in an organic solvent such as methanol, ethanol, benzene, acetone or toluene.

Examples of useful boron compounds are boron, boron oxide, boric acid, boron carbide, etc.

First Carbon Material Serving as Core Material

Usable as the first carbon material serving as a core material is preferably a graphite material, such as natural graphite, artificial graphite or pitch carbon fiber which is graphitized. Such graphite materials are at least 1 μm to up to 80 μm, preferably at least 5 μm to up to 40 μm, in mean particle size to be suitable for use as core materials.

To be advantageous from the viewpoint of discharge capacity, the first carbon material for use as the core material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method. To be more advantageous in discharge capacity, the first carbon material is at least 3.35 Å to not greater than 3.36 Å in the spacing $d_{002}$ and is at least 1000 Å in the size Lc.

Second Carbon Material for Coating the Surface of Core Material

The second carbon material for coating the surface of the core material is advantageous in storage characteristics when the second carbon material is at least 3.37 Å to not greater than 3.90 Å in the spacing $d_{002}$ between (002) planes thereof as determined by the X-ray wide-angle diffraction method.

The carbon material of the first feature of the invention contains preferably at least 0.01 wt. % to up to 3 wt. %, more preferably at least 0.25 wt. % to up to 1 wt. %, of boron. The second carbon material for coating the core material contains preferably at least 1 wt. % to up to 15 wt. %, more preferably at least 5 wt. % to up to 10 wt. %, of boron.

Amount of Second Carbon Material Coating the Surface of Core Material

The amount of the second carbon material coating the surface of the core material is preferably at least 1 wt. % to up to 20 wt. %, more preferably at least 5 wt. % to up to 10 wt. %, based on the combined amount of the component carbon materials of the carbon material embodying the first feature of the invention. The amount of coating is controllable by adjusting the duration of dipping of the first carbon material, i.e., the core material, in the organic compound or the frequency of dipping.

The carbon material of the first feature of the invention described is kneaded with a binder such as polytetrafluoroethylene (PTFE) or polyvinylidene fluoride (PVdF) in the usual manner to obtain a composition, which is used to prepare a negative electrode.

Examples of positive electrode materials usable for nonaqueous electrolyte secondary cells of the first feature of the invention are various positive electrode materials heretofore in use for nonaqueous cells, such as lithium containing metal oxides including lithium-cobalt oxide (LiCoO$_2$), lithium-nickel oxide (LiNiO$_2$) and lithium-manganese oxide (LiMn$_2$O$_4$), metal oxides including chromium oxide, titanium oxide, cobalt oxide and vanadium pentoxide, and chalcogen compounds of transition metals including titanium sulfide and molybdenum sulfide. The electrode material is kneaded with acetylene black, carbon black or like electrically conductive agent and polytetrafluoroethylene (PTFE), polyvinylidene fluoride (PVdF) or like binder to prepare a composition for use.

Examples of solvents usable for preparing electrolytic solutions for use in nonaqueous electrolyte secondary cells of the first feature of the invention are various solvents conventionally in use for nonaqueous cells, such as a solvent mixture of ethylene carbonate (EC) and diethyl carbonate (DEC). Examples of electrolytes usable are a wide variety of those heretofore used in nonaqueous electrolyte secondary cells, such as lithium hexafluorophosphate (LiPF$_6$).

Examples of separators usable for nonaqueous electrolyte secondary cells of the first feature of the invention are a wide variety of those conventionally in use for nonaqueous electrolyte secondary cells, such as finely porous membranes made from polyethylene or polypropylene and having high ionic conductivity.

Figure 2:
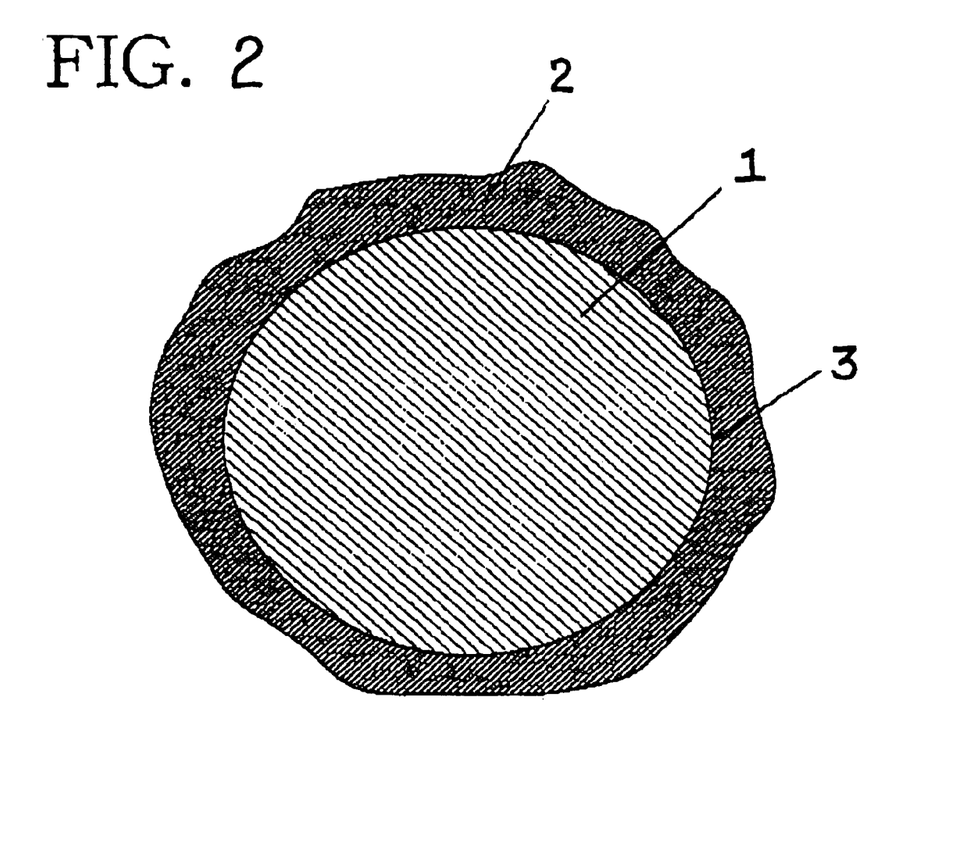
FIG. 2 is a cross-section of an embodiment of the carbon material of the invention.

The structure of the carbon material of the present invention is illustrated in FIG. 2. In FIG. 2, 1 is an inner core particle and 2 is a coating of the second carbon material on the outer surface 3 of the core particle 1.

The first feature of the present invention will be described in greater detail with reference to the following examples and comparative examples, to which the invention is in no way limited; the first feature of the invention can be embodied as modified suitably without altering the gist of the invention.

Experiment 1

An investigation was made on the characteristics of an electrode prepared from a carbon material of the first feature of the invention comprising a first carbon material serving as a core material and a boron-containing second carbon material coating the surface of the core material.

EXAMPLE 1

Preparation of Negative Electrode

A first carbon material in the form of a natural graphite powder ($d_{002}$=3.356 Å, Lc>1000 Å) and serving as a core material was dipped in molten pitch containing a boron oxide (B$_2$O$_3$) added thereto, thereafter withdrawn from the pitch and dried to obtain a pitch-coated graphite. The pitch contained 10 wt. % of boron. The pitch-coated graphite was fired in a nitrogen atmosphere at 1100° C. for 2 hours to obtain a carbon material having a surface coating of a boron-containing second carbon material and useful as a negative electrode active substance. The amount of the coating of the boron-containing second carbon material was 10 wt. % based on the combined amount of the component carbon materials (first carbon material and second carbon material).

The carbon material, i.e., the negative electrode active substance, was then mixed with a binder, i.e., polyvinylidene fluoride (PVdF), in the ratio by weight of 90:10 to obtain a negative electrode composition.

Subsequently, N-methyl-2-pyrrolidone was added to the composition to prepare a slurry, which was applied to copper foil. The coated foil was rolled and cut to a width of 42 mm to prepare a negative electrode.

Preparation of Positive Electrode

A powder of lithium cobalt oxide (LiCoO$_2$), carbon powder for use as an electrically conductive agent and polyvinylidene fluoride (PVdF) as a binder were mixed together in the ratio by weight of 90:5:5 to obtain a positive electrode composition.

Subsequently, N-methyl-2-pyrrolidone was added to the composition to prepare a slurry, which was applied to aluminum foil. The coated foil was rolled and cut to a width of 40 mm to prepare a positive electrode.

Preparation of Electrolytic Solution

Lithium hexafluorophosphate serving as a solute was dissolved in the ratio of 1 mole/liter in a solvent mixture of equal volumes of ethylene carbonate (EC) and diethyl carbonate (DEC) to prepare an electrolytic solution.

Fabrication of Nonaqueous Electrolyte Secondary Cell

Nonaqueous electrolyte secondary cell A1 in the form of a small cylinder and embodying the first feature of the invention was fabricated using a separator comprising a finely porous membrane of polypropylene, etc. in addition to the positive electrode, negative electrode and electrolytic solution prepared as above. The cell measured 14.2 mm in diameter and 50.0 mm in height.

Figure 1:
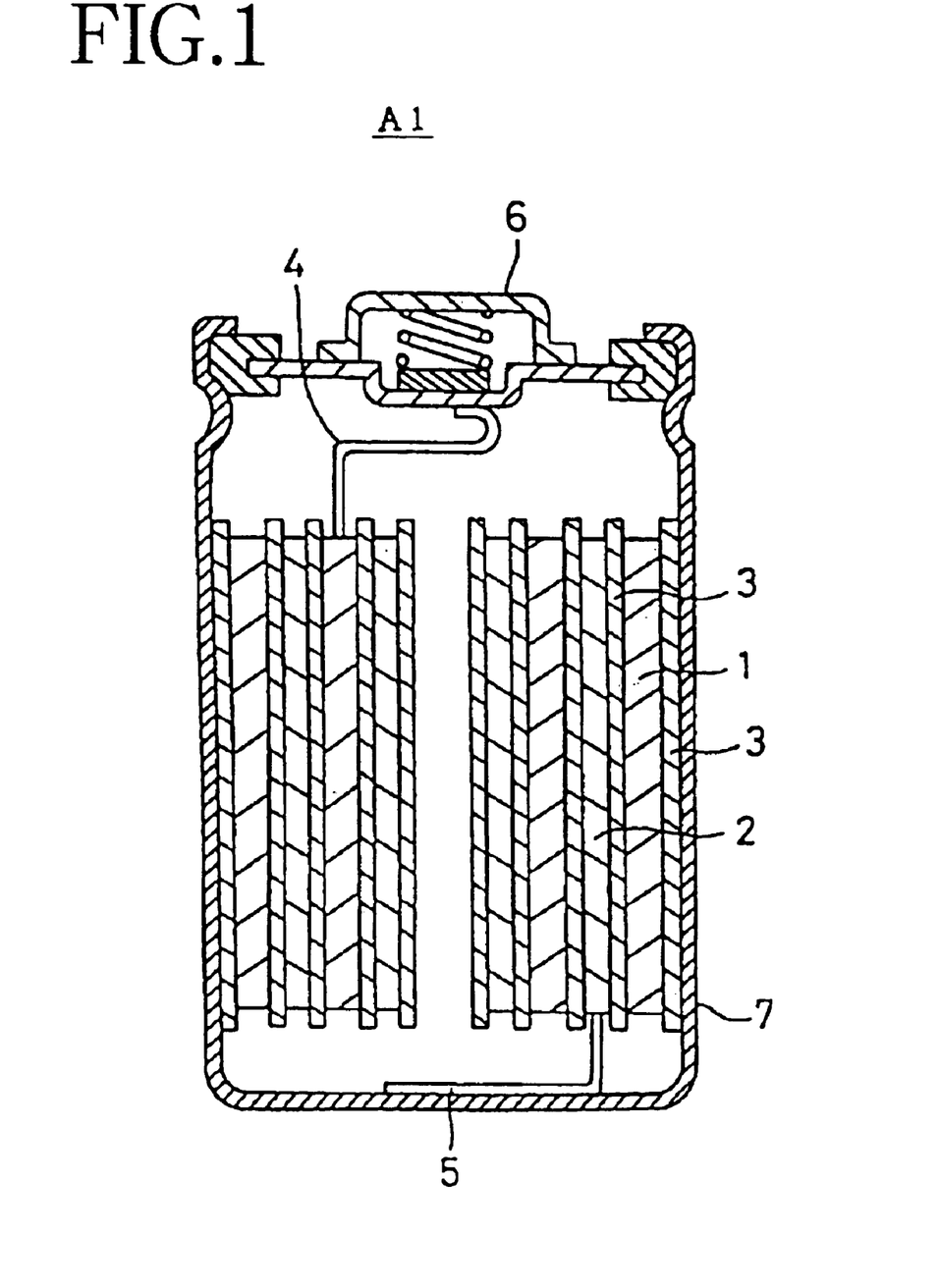
FIG. 1 is a view in section of a nonaqueous electrolyte secondary cell fabricated as an embodiment of the invention.

FIG. 1 is a sectional view of lithium cell A1 fabricated in the present example. Cell A1 comprises a positive electrode 1, negative electrode 2, separator 3 separating these electrodes from each other, positive-electrode lead 4 of aluminum, negative-electrode lead 5 of nickel, positive-electrode terminal 6 and negative-electrode can 7.

COMPARATIVE EXAMPLE 1

Nonaqueous electrolyte secondary cell X of Comparative Example 1 was fabricated in the same manner as in Example 1 with the exception of using a natural graphite powder ($d_{002}$=3.356 Å, Lc>1000 Å) as a negative electrode active substance.

COMPARATIVE EXAMPLE 2

A natural graphite powder ($d_{002}$=3.356 Å, Lc>1000 Å) serving as a core material was dipped in molten pitch, thereafter withdrawn from the pitch and dried to obtain a pitch-coated graphite. The pitch-coated graphite was fired in an inert atmosphere at 1100° C. for 2 hours to obtain a carbon material coated with boron-free carbon over the surface.

Nonaqueous electrolyte secondary cell Y of Comparative Example 2 was fabricated in the same manner as in Example 1 with the exception of using this carbon material as a negative electrode active substance. The carbon material of Comparative Example 2 comprises graphite coated with carbon of low crystallinity like the carbon material disclosed in JP-A No. 36108/1998.

COMPARATIVE EXAMPLE 3

Pitch containing a boron oxide (B$_2$O$_3$) added thereto was fired in an inert atmosphere at 1000° C. for 2 hours to obtain a boron-containing carbon material. Nonaqueous electrolyte secondary cell Z of Comparative Example 3 was fabricated in the same manner as in Example 1 with the exception of using this boron-containing carbon material as a negative electrode active substance.

Nonaqueous electrolyte secondary cells A1, X, Y and Z of Example 1 and Comparative Examples 1, 2, 3 were charged at a constant current value of 75 mA to a cell voltage of 4.2 V, then discharged to 2.7 V and thereafter checked for discharge capacity before being allowed to store. Subsequently, the cells were charged at a constant current value of 75 mA to a cell voltage of 4.2 V, allowed to store in a thermostatic chamber at 25° C. for 30 days, then discharged at a constant current value of 75 mA to a cell voltage of 2.7 V and thereafter checked for discharge capacity. The self-discharge rate of each cell was calculated from Mathematical Expression 1 given below. Table 1 shows the result.

(Mathematical Expression 1)

$$\text{Self-discharge rate} = \{(A-B)/A\} \times 100$$

wherein A is the discharge capacity before storage, and B is the discharge capacity after storage.

TABLE 1

| CELL | SELF-DISCHARGE RATE (%) |
|---|---|
| A1 | 12.0 |
| X | 18.2 |
| Y | 17.0 |
| Z | 15.8 |

Table 1 reveals that nonaqueous electrolyte secondary cell A1 of Example 1 embodying the first feature of the invention and incorporating the negative electrode of carbon material wherein the core material is coated with a boron-containing second carbon material is as low as 12.0% in self-discharge rate, thus exhibiting more excellent storage characteristics than nonaqueous electrolyte secondary cells X, Y and Z of the comparative examples. The cell of Comparative Example 3 wherein a boron-containing carbon material is used is lower than the other cells of Comparative Examples 1 and 2 in self-discharge rate.

Experiment 2

Next, an investigation was made on first carbon materials for use as core materials.

EXAMPLE 2

Nonaqueous electrolyte secondary cell A2 embodying the first feature of the invention was fabricated in the same manner as in Example 1 with the exception of using an artificial graphite ($d_{002}$=3.360 Å, Lc=600 Å) as the first carbon material, i.e., core material.

EXAMPLE 3

Nonaqueous electrolyte secondary cell A3 embodying the first feature of the invention was fabricated in the same manner as in Example 1 with the exception of using an artificial graphite ($d_{002}$=3.378 Å, Lc=300 Å) as the first carbon material, i.e., core material.

EXAMPLE 4

Nonaqueous electrolyte secondary cell A4 embodying the first feature of the invention was fabricated in the same manner as in Example 1 with the exception of using an artificial graphite ($d_{002}$=3.388 Å, Lc=200 Å) as the first carbon material, i.e., core material.

The nonaqueous electrolyte secondary cells of Examples 2 to 4 and 1 were tested for storage characteristics under the same conditions as in Experiment 1. The result is given in Table 2 below, in which the discharge capacity is the value before storage.

TABLE 2

| CELL | FIRST CARBON MATERIAL | $d_{002}$ (Å) | $L_c$ (Å) | DISCHARGE CAPACITY (mAh) | SELF-DISCHARGE RATE (%) |
|---|---|---|---|---|---|
| A1 | NATURAL GRAPHITE | 3.356 | >1000 | 600 | 12.0 |
| A2 | ARTIFICIAL GRAPHITE | 3.360 | 600 | 560 | 12.1 |
| A3 | ARTIFICIAL GRAPHITE | 3.378 | 300 | 500 | 12.1 |
| A4 | ARTIFICIAL GRAPHITE | 3.388 | 200 | 420 | 12.3 |

Table 2 indicates that the cell has a great and excellent discharge capacity when the first carbon material, i.e., the core material, is at least 3.35 Å to not greater than 3.38 Å in the spacing $d_{002}$ between (002) planes thereof and at least 300 Å in the size Lc of crystallites in the direction of c-axis thereof as determined by the X-ray wide-angle diffraction method. A greater discharge capacity is available when the material is preferably at least 3.35 Å to not greater than 3.36 Å in $d_{002}$ and at least 1000 Å in Lc.

Experiment 3

Next, an investigation was made on second carbon materials for coating the core material.

EXAMPLE 5

A natural graphite powder ($d_{002}$=3.356 Å, Lc>1000 Å) was dipped in molten pitch containing a boron oxide ($B_2O_3$) added thereto, thereafter withdrawn from the pitch and dried to obtain a pitch-coated graphite. The pitch contained 10 wt. % of boron. The pitch-coated graphite was fired in a nitrogen atmosphere at 2400° C. for 2 hours to obtain a carbon material coated over the surface thereof with boron-containing carbon (second carbon material). The amount of the coating of the boron-containing second carbon material was 10 wt. % based on the combined amount of the component carbon materials (first carbon material and second carbon material). Nonaqueous electrolyte secondary cell A5 embodying the first feature of the invention was fabricated in the same manner as in Example 1 with the exception of using the resulting carbon material as a negative electrode active substance.

EXAMPLE 6

A natural graphite powder ($d_{002}$=3.356 Å, Lc>1000 Å) was dipped in molten pitch containing a boron oxide ($B_2O_3$) added thereto, thereafter withdrawn from the pitch and dried to obtain a pitch-coated graphite. The pitch contained 10 wt. % of boron. The pitch-coated graphite was fired in a nitrogen atmosphere at 2800° C. for 2 hours to obtain a carbon material coated over the surface thereof with boron-containing carbon (second carbon material). The amount of the coating of the boron-containing second carbon material was 10 wt. % based on the combined amount of the component carbon materials (first carbon material and second carbon material). Nonaqueous electrolyte secondary cell A6 embodying the first feature of the invention was fabricated in the same manner as in Example 1 with the exception of using the resulting carbon material as a negative electrode active substance.

EXAMPLE 7

A natural graphite powder ($d_{002}$=3.356 Å, Lc>1000 Å) was dipped in molten furfuryl alcohol resin containing a boron oxide ($B_2O_3$) added thereto, thereafter withdrawn from the resin and dried to obtain a graphite coated with the furfuryl alcohol resin. The furfuryl alcohol resin contained 10 wt. % of boron. The resin-coated graphite was fired in a nitrogen atmosphere at 1100° C. for 2 hours to obtain a carbon material coated over the surface thereof with boron-containing carbon (second carbon material). The amount of the coating of the boron-containing second carbon material was 10 wt. % based on the combined amount of the component carbon materials (first carbon material and second carbon material). Nonaqueous electrolyte secondary cell A7 embodying the first feature of the invention was fabricated in the same manner as in Example 1 with the exception of using the resulting carbon material as a negative electrode active substance.

EXAMPLE 8

A natural graphite powder ($d_{002}$=3.356 Å, Lc>1000 Å) was dipped in molten furfuryl alcohol resin containing a boron oxide ($B_2O_3$) added thereto, thereafter withdrawn from the resin and dried to obtain a graphite coated with the furfuryl alcohol resin. The furfuryl alcohol resin contained 10 wt. % of boron. The resin-coated graphite was fired in a nitrogen atmosphere at 700° C. for 2 hours to obtain a carbon material coated over the surface thereof with boron-containing carbon (second carbon material). The amount of the coating of the boron-containing second carbon material was 10 wt. % based on the combined amount of the component carbon materials (first carbon material and second carbon material). Nonaqueous electrolyte secondary cell A8 embodying the first feature of the invention was fabricated in the same manner as in Example 1 with the exception of using the resulting carbon material as a negative electrode active substance.

The second carbon material coating the surface of the core material and used in each of the nonaqueous electrolyte secondary cells of Examples 5 to 8 and 1 was checked for the spacing $d_{002}$ between (002) planes by the X-ray wide-angle diffraction method, and each cell was also tested for storage characteristics under the same conditions as in Experiment 1. The result is given in Table 3 below.

TABLE 3

| CELL | $d_{002}$ (Å) OF SECOND CARBON MATERIAL | SELF-DISCHARGE RATE (%) |
|---|---|---|
| A1 | 3.420 | 12.0 |
| A5 | 3.372 | 12.8 |
| A6 | 3.356 | 14.0 |
| A7 | 3.86 | 12.6 |
| A8 | 3.98 | 14.2 |

As will be apparent from Table 3, a small self-discharge rate of 12.0% to 12.8%, indicating excellent storage characteristics, is achieved by cells A1, A5 and A7 wherein the second carbon material coating the surface of the core material is in the range of at least 3.37 Å to not greater than 3.90 Å in the spacing $d_{002}$ between (002) planes as determined by the X-ray wide-angle diffraction method.

Experiment 4

Next, an investigation was made on the boron content of the second carbon material for coating the core material.

EXAMPLES 9–13

Nonaqueous electrolyte secondary cells A9 to A13 embodying the first feature of the invention were fabricated in the same manner as in Example 1 with the exception of using a pitch having a boron content of 0.5 wt. % (Example 9), 1 wt. % (Example 10), 5 wt. % (Example 11), 15 wt. % (Example 12) or 20 wt. % (Example 13).

The cells of Examples 9 to 13 and 1 were tested for storage characteristics under the same conditions as in Experiment 1. Table 4 below shows the result.

TABLE 4

| CELL | B CONTENT OF SECOND CARBON MATERIAL (WT. %) | SELF-DISCHARGE RATE (%) |
|---|---|---|
| A9 | 0.5 | 14.0 |
| A10 | 1 | 12.9 |
| A11 | 5 | 12.2 |
| A1 | 10 | 12.0 |
| A12 | 15 | 12.8 |
| A13 | 20 | 13.8 |

Table 4 indicates that a small self-discharge rate and excellent storage characteristics are available when the second carbon material coating the surface of the core material has a boron content ranging from at least 1 wt. % to not greater than 15 wt. %. The boron content is preferably in the range of at least 5 wt. % to not greater than 10 wt. % to obtain a smaller self-discharge rate and more excellent storage characteristics.

Experiment 5

Next, an investigation was made on the amount of the second carbon material for coating the core material.

EXAMPLES 14–18

Nonaqueous electrolyte secondary cells A14 to A18 were fabricated in the same manner as in Example 1 except that the amount of the boron-containing second carbon material coating the surface of the core material was 0.5 wt. % (Example 14), 1 wt. % (Example 15), 5 wt. % (Example 16), 20 wt. % (Example 17) or 25 wt. % (Example 18) based on the combined amount of the first and second carbon materials.

The cells of Examples 14 to 18 and 1 were tested for storage characteristics under the same conditions as in Experiment 1. Table 5 given below shows the result.

TABLE 5

| CELL | AMOUNT OF COATING (WT. %) | SELF-DISCHARGE RATE (%) |
|---|---|---|
| A14 | 0.5 | 14.2 |
| A15 | 1 | 12.8 |
| A16 | 5 | 12.3 |
| A1 | 10 | 12.0 |
| A17 | 20 | 12.6 |
| A18 | 25 | 13.6 |

Table 5 indicates that a small self-discharge rate and excellent storage characteristics are available when the amount of the second carbon material coating the surface of the core material is in the range of from at least 1 wt. % to not greater than 20 wt. % based on the combined amount of the first and second carbon materials. The amount is preferably in the range of at least 5 wt. % to not greater than 10 wt. % to obtain a smaller self-discharge rate and more excellent storage characteristics.

As will be apparent from the results of Experiments 4 and 5, the boron content in the combined amount of the first and second carbon materials is preferably in the range of at least 0.01 wt. % to up to 3 wt. %, more preferably in the range of at least 0.25 wt. % to up to 1 wt. %, from the viewpoint of storage characteristics.

Although the first feature of the present invention has been described above as embodied in the form of small cylindrical cells, the invention is not limited specifically with respect to the shape of cells; the first feature of the invention can be embodied as nonaqueous electrolyte secondary cells of various shapes including flat, rectangular or rectangular parallelepipedal shapes.

The foregoing embodiments contain no boron in the first carbon material included in the carbon material of the first feature of the invention, whereas it is expectable, for example, from the value of self-discharge rate of cell Z in Table 1 above that presence of a small amount of boron in the first carbon material will contribute to an improvement in the storage characteristics of secondary cells.

B. Second Feature of the Invention as Embodied

A detailed description will be given of embodiments of second feature of the invention.

Preparation of Carbon Material Having a Surface Coating of Boron- and Nitrogen-containing Carbon Material A carbon material having a surface coating of boron- and nitrogen-containing carbon material can be prepared by dipping a first carbon material serving as a core material in an organic compound which can be carbonized and has a boron compound and a nitrogen compound added thereto, separating the material from the compound and thereafter carbonizing the material at a temperature of at least 500° C. to up to 1800° C., preferably at least 700° C. to up to 1400° C.

Examples of useful organic compounds are pitch and tar, and solutions of phenol-formaldehyde resin, furfuryl alcohol resin, carbon black, vinylidene chloride, cellulose or the like in an organic solvent such as methanol, ethanol, benzene, acetone or toluene. Examples of useful boron compounds are boron, boron oxide, boric acid, boron carbide, etc. Examples of useful nitrogen compounds are acetonitrile and like compounds having a nitrogen-containing functional group, pyridine and like nitrogen-containing heterocyclic compounds, etc.

First Carbon Material Serving as Core Material

Usable as the first carbon material serving as a core material is preferably a graphite material, such as natural graphite, artificial graphite or pitch carbon fiber which is graphitized. Such graphite materials are at least 1 μm to up to 80 μm, preferably at least 5 μm to up to 40 μm, in mean particle size to be suitable for use as core materials.

To be advantageous from the viewpoint of discharge capacity, the first carbon material for use as the core material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method. To be more advantageous in discharge capacity, the first carbon material is at least 3.35 Å to not greater than 3.36 Å in the spacing $d_{002}$ and is at least 1000 Å in the size Lc.

Second Carbon Material for Coating the Surface of Core Material

The second carbon material for coating the surface of the core material is preferable when the second carbon material is at least 3.37 Å to not greater than 3.90 Å in the spacing $d_{002}$ between (002) planes thereof as determined by the X-ray wide-angle diffraction method.

The carbon material of the second feature of the invention contains preferably at least 0.01 wt. % to up to 3 wt. %, more preferably at least 0.25 wt. % to up to 1.5 wt. %, of boron based on the combined amount of the first carbon material and the second carbon material. The second carbon material for coating the core material contains preferably at least 1 wt. % to up to 15 wt. %, more preferably at least 5 wt. % to up to 10 wt. %, of boron.

The carbon material of the second feature of the invention contains preferably at least 0.01 wt. % to up to 2 wt. %, more preferably at least 0.15 wt. % to up to 0.75 wt. %, of nitrogen based on the combined amount of the first carbon material and the second carbon material. The second carbon material for coating the core material contains preferably at least 1 wt. % to up to 10 wt. %, more preferably at least 3 wt. % to up to 5 wt. %, of nitrogen.

Amount of Second Carbon Material Coating the Surface of Core Material

The amount of the second carbon material coating the surface of the core material is preferably at least 1 wt. % to up to 20 wt. %, more preferably at least 5 wt. % to up to 15 wt. %, based on the combined amount of the component carbon materials of the carbon material embodying the second feature of the invention. The amount of coating is controllable by adjusting the duration of dipping of the first carbon material, i.e., the core material, in the organic compound or the frequency of dipping.

The carbon material of the second feature of the invention described is kneaded with a binder such as polytetrafluoroethylene (PTFE) or polyvinylidene fluoride (PVdF) in the usual manner to obtain a composition, which is used to prepare a negative electrode.

Examples of positive electrode materials usable for nonaqueous electrolyte secondary cells of the second feature of the invention are various positive electrode materials heretofore in use for nonaqueous cells, such as lithium containing metal oxides including lithium-cobalt oxide ($LiCoO_2$), lithium-nickel oxide ($LiNiO_2$) and lithium-manganese oxide ($LiMn_2O_4$), metal oxides including chromium oxide, titanium oxide, cobalt oxide and vanadium pentoxide, and chalcogen compounds of transition metals including titanium sulfide and molybdenum sulfide. The electrode material is kneaded with acetylene black, carbon black or like electrically conductive agent and polytetrafluoroethylene (PTFE), polyvinylidene fluoride (PVdF) or like binder to prepare a composition for use.

Examples of solvents usable for preparing electrolytic solutions for use in nonaqueous electrolyte secondary cells of the second feature of the invention are various solvents conventionally in use for nonaqueous cells, such as a solvent mixture of ethylene carbonate (EC) and diethyl carbonate (DEC). Examples of electrolytes usable are a wide variety of those heretofore used in nonaqueous electrolyte secondary cells, such as lithium hexafluorophosphate ($LiPF_6$).

Examples of separators usable for nonaqueous electrolyte secondary cells of the second feature of the invention are a wide variety of those conventionally in use for nonaqueous electrolyte secondary cells, such as finely porous membranes made from polyethylene or polypropylene and having high ionic conductivity.

The second feature of the present invention will be described in greater detail with reference to the following examples and comparative examples, to which the invention is in no way limited; the first feature of the invention can be embodied as modified suitably without altering the gist of the invention.

Experiment 6

An investigation was made on the characteristics of an electrode prepared from a carbon material of the second feature of the invention comprising a first carbon material serving as a core material and a boron- and nitrogen-containing second carbon material coating the surface of the core material.

EXAMPLE 19

Preparation of Negative Electrode

A first carbon material in the form of a natural graphite powder ($d_{002}$=3.356 Å, Lc>1000 Å) and serving as a core material was dipped in molten pitch containing a boron oxide ($B_2O_3$) and acetonitrile added thereto, thereafter withdrawn therefrom and dried to obtain a pitch-coated graphite. The pitch contained 10 wt. % of boron and 5 wt. % of nitrogen. The pitch-coated graphite was fired in a nitrogen atmosphere at 1100° C. for 2 hours to obtain a carbon material having a surface coating of a boron- and nitrogen-containing second carbon material and useful as a negative electrode active substance. The amount of the coating of the boron- and nitrogen-containing second carbon material was 10 wt. % based on the combined amount of the component carbon materials (first carbon material and second carbon material).

The carbon material, i.e., the negative electrode active substance, was then mixed with a binder, i.e., polyvinylidene fluoride (PVdF), in the ratio by weight of 90:10 to obtain a negative electrode composition.

Subsequently, N-methyl-2-pyrrolidone was added to the composition to prepare a slurry, which was applied to copper foil. The coated foil was rolled and cut to a width of 42 mm to prepare a negative electrode.

Preparation of Positive Electrode

A powder of lithium cobalt oxide ($LiCoO_2$), carbon powder for use as an electrically conductive agent and polyvinylidene fluoride (PVdF) as a binder were mixed together in the ratio by weight of 90:5:5 to obtain a positive electrode composition.

Subsequently, N-methyl-2-pyrrolidone was added to the composition to prepare a slurry, which was applied to aluminum foil. The coated foil was rolled and cut to a width of 40 mm to prepare a positive electrode.

Preparation of Electrolytic Solution

Lithium hexafluorophosphate serving as a solute was dissolved in the ratio of 1 mole/liter in a solvent mixture of equal volumes of ethylene carbonate (EC) and diethyl carbonate (DEC) to prepare an electrolytic solution.

Fabrication of Nonaqueous Electrolyte Secondary Cell

Nonaqueous electrolyte secondary cell AA1 in the form of a small cylinder and embodying the second feature of the invention was fabricated using a separator comprising a finely porous membrane of polypropylene, etc. in addition to the positive electrode, negative electrode and electrolytic solution prepared as above. The cell measured 14.2 mm in diameter and 50.0 mm in height. The cell had the same shape and construction as shown in FIG. 1, like those of the first feature described.

COMPARATIVE EXAMPLE 4

Nonaqueous electrolyte secondary cell X1 of Comparative Example 4 was fabricated in the same manner as in Example 19 with the exception of using a natural graphite powder ($d_{002}$=3.356 Å, Lc>1000 Å) as a negative electrode active substance.

COMPARATIVE EXAMPLE 5

A natural graphite powder ($d_{002}$=3.356 Å, Lc>1000 Å) serving as a core material was dipped in molten pitch, thereafter withdrawn from the pitch and dried to obtain a pitch-coated graphite. The pitch-coated graphite was fired in an inert atmosphere at 1100° C. for 2 hours to obtain a carbon material coated with carbon containing no boron and no nitrogen over the surface. Nonaqueous electrolyte secondary cell Y1 was fabricated in the same manner as in Example 19 with the exception of using this carbon material as a negative electrode active substance. The carbon material of Comparative Example 5 comprises graphite coated with carbon of low crystallinity like the carbon material disclosed in JP-A No. 36108/1998.

COMPARATIVE EXAMPLE 6

A natural graphite powder ($d_{002}$=3.356 Å, Lc>1000 Å) was dipped in molten pitch containing a boron oxide ($B_2O_3$) added thereto, thereafter withdrawn from the pitch and dried to obtain a pitch-coated graphite. The pitch contained 10 wt. % of boron. The pitch-coated graphite was fired in an inert atmosphere at 1100° C. for 2 hours to obtain a carbon material having a surface coating of boron-containing carbon. Nonaqueous electrolyte secondary cell Y2 was fabricated in the same manner as in Example 19 with the exception of using the resulting carbon material as a negative electrode active substance. Incidentally, cell Y2 is the same as cell A1 of Example 1.

COMPARATIVE EXAMPLE 7

A natural graphite powder ($d_{002}$=3.356 Å, Lc>1000 Å) was dipped in molten pitch containing acetonitrile added thereto, thereafter withdrawn from the pitch and dried to obtain a pitch-coated graphite. The pitch contained 5 wt. % of nitrogen. The pitch-coated graphite was fired in an inert atmosphere at 1100° C. for 2 hours to obtain a carbon material having a surface coating of nitrogen-containing carbon. Nonaqueous electrolyte secondary cell Y3 was fabricated in the same manner as in Example 19 with the exception of using the resulting carbon material as a negative electrode active substance.

COMPARATIVE EXAMPLE 8

A boron oxide ($B_2O_3$) was added to pitch, which was then fired in an inert atmosphere at 1100° C. for 2 hours to obtain a boron-containing carbon material. Nonaqueous electrolyte secondary cell Z1 was fabricated in the same manner as in Example 19 with the exception of using this boron-containing carbon material as a negative electrode active substance.

COMPARATIVE EXAMPLE 9

Acetonitrile was added to pitch, which was then fired in an inert atmosphere at 1100° C. for 2 hours to obtain a nitrogen-containing carbon material. Nonaqueous electrolyte secondary cell Z2 was fabricated in the same manner as in Example 19 with the exception of using this nitrogen-containing carbon material as a negative electrode active substance.

The nonaqueous electrolyte secondary cells of Example 19 and Comparative Examples 4 to 9 were charged at a constant current value of 75 mA to a cell voltage of 4.2 V, then discharged to 2.7 V and thereafter checked for discharge capacity before being allowed to store. Subsequently, the cells were charged at a constant current value of 75 mA to a cell voltage of 4.2 V, allowed to store in a thermostatic chamber at 25° C. for 30 days, then discharged at a constant current value of 75 mA to a cell voltage of 2.7 V and thereafter checked for discharge capacity. The self-discharge rate of each cell was calculated from Mathematical Expression 1 given previously. Table 6 shows the result.

TABLE 6

| CELL | SELF-DISCHARGE RATE (%) |
|---|---|
| AA1 | 9.8 |
| X1 | 18.2 |
| Y1 | 17.0 |
| Y2 | 12.0 |
| Y3 | 16.4 |
| Z1 | 15.8 |
| Z2 | 16.6 |

Table 6 reveals that nonaqueous electrolyte secondary cell AA1 of Example 19 embodying the second feature of the invention and incorporating the negative electrode of carbon material wherein the core material is coated with a boron- and nitrogen-containing second carbon material is as low as 9.8% in self-discharge rate, thus exhibiting more excellent storage characteristics than the nonaqueous electrolyte secondary cells of the comparative examples.

Experiment 7

Next, an investigation was made on first carbon materials for use as core materials.

EXAMPLE 20

Nonaqueous electrolyte secondary cell AB1 embodying the second feature of the invention was fabricated in the same manner as in Example 19 with the exception of using an artificial graphite ($d_{002}$=3.360 Å, Lc=600 Å) as the first carbon material, i.e., core material.

EXAMPLE 21

Nonaqueous electrolyte secondary cell AB2 embodying the second feature of the invention was fabricated in the same manner as in Example 19 with the exception of using an artificial graphite ($d_{002}$=3.378 Å, Lc=300 Å) as the first carbon material, i.e., core material.

EXAMPLE 22

Nonaqueous electrolyte secondary cell AB3 embodying the second feature of the invention was fabricated in the same manner as in Example 19 with the exception of using an artificial graphite ($d_{002}$=3.388 Å, Lc=200 Å) as the first carbon material, i.e., core material.

The nonaqueous electrolyte secondary cells of Examples 20 to 22 and 19 were tested for storage characteristics under the same conditions as in Experiment 6. The result is given in Table 7 below, in which the discharge capacity is the value before storage.

TABLE 7

| CELL | FIRST CARBON MATERIAL | $d_{002}$ (Å) | $L_c$ (Å) | DISCHARGE CAPACITY (mAh) | SELF-DISCHARGE RATE (%) |
|---|---|---|---|---|---|
| AA1 | NATURAL GRAPHITE | 3.356 | >1000 | 600 | 9.8 |
| AB1 | ARTIFICIAL GRAPHITE | 3.360 | 600 | 560 | 9.9 |
| AB2 | ARTIFICIAL GRAPHITE | 3.378 | 300 | 500 | 10.0 |
| AB3 | ARTIFICIAL GRAPHITE | 3.388 | 200 | 420 | 10.0 |

Table 7 indicates that the cell has a great and excellent discharge capacity when the first carbon material, i.e., the core material, is at least 3.35 Å to not greater than 3.38 Å in the spacing $d_{002}$ between (002) planes thereof and at least 300 Å in the size Lc of crystallites in the direction of c-axis thereof as determined by the X-ray wide-angle diffraction method. A greater discharge capacity is available when the material is at least 3.35 Å to not greater than 3.36 Å in $d_{002}$ and at least 1000 Å in Lc.

Experiment 8

Next, an investigation was made on second carbon materials for coating the core material.

EXAMPLE 23

A natural graphite powder ($d_{002}$=3.356 Å, Lc>1000 Å) was dipped in molten pitch containing a boron oxide ($B_2O_3$) and acetonitrile added thereto, thereafter withdrawn from the pitch and dried to obtain a pitch-coated graphite. The pitch contained 10 wt. % of boron and 5 wt. % of nitrogen. The pitch-coated graphite was fired in a nitrogen atmosphere at 2400° C. for 2 hours to obtain a carbon material coated over the surface thereof with boron- and nitrogen-containing carbon (second carbon material). The amount of the coating of the boron- and nitrogen-containing second carbon material was 10 wt. % based on the combined amount of the component carbon materials (first carbon material and second carbon material). Nonaqueous electrolyte secondary cell AC1 embodying the second feature of the invention was fabricated in the same manner as in Example 19 with the exception of using the resulting carbon material as a negative electrode active substance.

EXAMPLE 24

A natural graphite powder ($d_{002}$=3.356 Å, Lc>1000 Å) was dipped in molten pitch containing a boron oxide ($B_2O_3$) and acetonitrile added thereto, thereafter withdrawn from the pitch and dried to obtain a pitch-coated graphite. The pitch contained 10 wt. % of boron and 5 wt. % of nitrogen. The pitch-coated graphite was fired in a nitrogen atmosphere at 2800° C. for 2 hours to obtain a carbon material coated over the surface thereof with boron- and nitrogen-containing carbon (second carbon material). The amount of the coating of the boron- and nitrogen-containing second carbon material was 10 wt. % based on the combined amount of the component carbon materials (first carbon material and second carbon material). Nonaqueous electrolyte secondary cell AC2 embodying the second feature of the invention was fabricated in the same manner as in Example 19 with the exception of using the resulting carbon material as a negative electrode active substance.

EXAMPLE 25

A natural graphite powder ($d_{002}$=3.356 Å, Lc>1000 Å) was dipped in molten furfuryl alcohol resin containing a boron oxide ($B_2O_3$) and acetonitrile added thereto, thereafter withdrawn from the resin and dried to obtain a graphite coated with the furfuryl alcohol resin. The furfuryl alcohol resin contained 10 wt. % of boron and 5 wt. % of nitrogen. The resin-coated graphite was fired in a nitrogen atmosphere at 1100° C. for 2 hours to obtain a carbon material coated over the surface thereof with boron- and nitrogen-containing carbon (second carbon material). The amount of the coating of the boron-and nitrogen-containing second carbon material was 10 wt. % based on the combined amount of the component carbon materials (first carbon material and second carbon material). Nonaqueous electrolyte secondary cell AC3 embodying the second feature of the invention was fabricated in the same manner as in Example 19 with the exception of using the resulting carbon material as a negative electrode active substance.

EXAMPLE 26

A natural graphite powder ($d_{002}$=3.356 Å, Lc>1000 Å) was dipped in molten furfuryl alcohol resin containing a boron oxide ($B_2O_3$) and acetonitrile added thereto, thereafter withdrawn from the resin and dried to obtain a graphite coated with the furfuryl alcohol resin. The furfuryl alcohol resin contained 10 wt. % of boron and 5 wt. % of nitrogen. The resin-coated graphite was fired in an inert gas atmosphere at 700° C. for 2 hours to obtain a carbon material coated over the surface thereof with boron- and nitrogen-containing carbon (second carbon material). The amount of the coating of the boron- and nitrogen-containing second carbon material was 10 wt. % based on the combined amount of the component carbon materials (first carbon material and second carbon material). Nonaqueous electrolyte secondary cell AC4 embodying the second feature of the invention was fabricated in the same manner as in Example 19 with the exception of using the resulting carbon material as a negative electrode active substance.

The second carbon material coating the surface of the core material and used in each of the nonaqueous electrolyte secondary cells of Examples 23 to 26 and 19 was checked for the spacing $d_{002}$ between (002) planes by the X-ray wide-angle diffraction method, and each cell was also tested for storage characteristics under the same conditions as in Experiment 6. The result is given in Table 8 below.

TABLE 8

| CELL | $d_{002}$ (Å) OF SECOND CARBON MATERIAL | SELF-DISCHARGE RATE (%) |
|---|---|---|
| AA1 | 3.420 | 9.8 |
| AC1 | 3.372 | 10.1 |
| AC2 | 3.356 | 10.9 |
| AC3 | 3.86 | 10.2 |
| AC4 | 3.98 | 10.8 |

As will be apparent from Table 8, a small self-discharge rate of about 10%, indicating excellent storage characteristics, is achieved by cells AA1, AC1 and AC3 wherein the second carbon material coating the surface of the core material is in the range of at least 3.37 Å to not greater than 3.90 Å in the spacing $d_{002}$ between (002) planes as determined by the X-ray wide-angle diffraction method.

Experiment 9

Next, an investigation was made on the boron content of the second carbon material for coating the core material.

EXAMPLES 27–31

Nonaqueous electrolyte secondary cells BA1 to BA5 embodying the second feature of the invention were fabricated in the same manner as in Example 19 with the exception of using pitch having a boron content of 0.5 wt. % (Example 27), 1 wt. % (Example 28), 5 wt. % (Example 29), 15 wt. % (Example 30) or 20 wt. % (Example 31).

The cells of Examples 27 to 31 and 19 were tested for storage characteristics under the same conditions as in Experiment 6. Table 9 below shows the result.

TABLE 9

| CELL | B CONTENT OF SECOND CARBON MATERIAL (WT. %) | SELF-DISCHARGE RATE (%) |
|---|---|---|
| BA1 | 0.5 | 11.2 |
| BA2 | 1 | 10.4 |
| BA3 | 5 | 10.0 |
| AA1 | 10 | 9.8 |
| BA4 | 15 | 10.3 |
| BA5 | 20 | 11.1 |

Table 9 indicates that a small self-discharge rate and excellent storage characteristics are available when the second carbon material coating the surface of the core material has a boron content ranging from at least 1 wt. % to not greater than 15 wt. %. The boron content is preferably in the range of at least 5 wt. % to not greater than 10 wt. % to obtain a smaller self-discharge rate and more excellent storage characteristics.

Experiment 10

Next, an investigation was made on the nitrogen content of the second carbon material for coating the core material.

EXAMPLES 32–36

Nonaqueous electrolyte secondary cells BB1 to BB5 embodying the second feature of the invention were fabricated in the same manner as in Example 19 with the exception of using pitch having a nitrogen content of 0.5 wt. % (Example 32), 1 wt. % (Example 33), 3 wt. % (Example 34), 10 wt. % (Example 35) or 15 wt. % (Example 36).

The cells of Examples 32 to 36 and 19 were tested for storage characteristics under the same conditions as in Experiment 6. Table 10 below shows the result.

TABLE 10

| CELL | N CONTENT OF SECOND CARBON MATERIAL (WT. %) | SELF-DISCHARGE RATE (%) |
|---|---|---|
| BB1 | 0.5 | 10.9 |
| BB2 | 1 | 10.2 |
| BB3 | 3 | 9.9 |
| AA1 | 5 | 9.8 |
| BB4 | 10 | 10.3 |
| BB5 | 15 | 11.0 |

Table 10 indicates that a small self-discharge rate and excellent storage characteristics are available when the second carbon material coating the surface of the core material has a nitrogen content ranging from at least 1 wt. % to not greater than 10 wt. %. The nitrogen content is preferably in the range of at least 3 wt. % to not greater than 5 wt. % to obtain a smaller self-discharge rate and more excellent storage characteristics.

Experiment 11

Next, an investigation was made on the amount of the second carbon material for coating the core material.

EXAMPLES 37–42

Nonaqueous electrolyte secondary cells CA1 to CA6 were fabricated in the same manner as in Example 19 except that the amount of the boron- and nitrogen-containing second carbon material coating the surface of the core material was 0.5 wt. % (Example 37), 1 wt. % (Example 38), 5 wt. % (Example 39), 15 wt. % (Example 40), 20 wt. % (Example 41) or 25 wt. % (Example 42) based on the combined amount of the first and second carbon materials.

The cells of Examples 37 to 42 and 19 were tested for storage characteristics under the same conditions as in Experiment 6. Table 11 given below shows the result.

TABLE 11

| CELL | AMOUNT OF COATING (WT.%) | SELF-DISCHARGE RATE (%) |
|---|---|---|
| CA1 | 0.5 | 11.5 |
| CA2 | 1 | 10.5 |
| CA3 | 5 | 10.2 |
| AA1 | 10 | 9.8 |
| CA4 | 15 | 10.1 |
| CA5 | 20 | 10.6 |
| CA6 | 25 | 11.3 |

Table 11 indicates that a small self-discharge rate and excellent storage characteristics are available when the amount of the second carbon material coating the surface of the core material is in the range of from at least 1 wt. % to not greater than 20 wt. % based on the combined amount of the first and second carbon materials. The amount is preferably in the range of at least 5 wt. % to not greater than 15 wt. % to obtain a smaller self-discharge rate and more excellent storage characteristics.

As will be apparent from the results of Experiments 9 and 11, the boron content in the combined amount of the first and second carbon materials is preferably in the range of at least 0.01 wt. % to up to 3 wt. %, more preferably in the range of at least 0.25 wt. % to up to 1.5 wt. %, from the viewpoint of storage characteristics.

Further as will be apparent from the results of Experiments 10 and 11, the nitrogen content in the combined amount of the first and second carbon materials is preferably in the range of at least 0.01 wt. % to up to 2 wt. %, more preferably in the range of at least 0.15 wt. % to up to 0.75 wt. %, from the viewpoint of storage characteristics.

Although the first and second features of the present invention have been described above as embodied in the form of small cylindrical cells, the invention is not limited specifically in the shape of cells; the second feature of the invention can be embodied as nonaqueous electrolyte secondary cells of various shapes including flat, rectangular or rectangular parallelepipedal shapes.

The foregoing embodiments contain no boron and no nitrogen in the first carbon material included in the carbon material of the second feature of the invention, whereas a small quantity of at least one of boron and nitrogen may be present in the first carbon material.

Thus, the present invention provides carbon materials which are useful as the negative electrode active substance of nonaqueous electrolyte secondary cells to diminish the reduction in cell capacity that would result if the cell is allowed to store, and which are suitable for giving improved storage characteristics to the cell. The invention also provides electrodes which are suitable as negative electrodes for use in nonaqueous electrolyte secondary cells to diminish the reduction in cell capacity that would result if the cell is allowed to store, giving improved storage characteristics to the cell.

What is claimed is:

1. A carbon material comprising a first carbon material serving as an inner core particle having an outer surface, and a coating of a second carbon material on said outer surface of the first carbon material, the second carbon material containing at least 1 wt. % to up to 15 wt. % of boron.

2. A carbon material according to claim 1 wherein the first carbon material contains no boron.

3. A carbon material according to claim 1 wherein the first carbon material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method.

4. A carbon material according to claim 1 wherein the first carbon material is at least 3.35 Å to not greater than 3.36 Å in the spacing $d_{002}$ between (002) planes thereof and is at least 1000 Å in the size Lc of crystallites in the direction of c-axis thereof as determined by the X-ray wide-angle diffraction method.

5. A carbon material according to claim 1 wherein the second carbon material is at least 3.37 Å to not greater than 3.90 Å in the spacing $d_{002}$ between (002) planes thereof as determined by the X-ray wide-angle diffraction method.

6. A carbon material according to claim 1 wherein the second carbon material contains at least 5 wt. % to up to 10 wt. % of boron.

7. A carbon material according to claim 1 wherein the amount of the second carbon material is at least 1 wt. % to up to 20 wt. % based on the combined amount of the first carbon material and the second carbon material.

8. A carbon material according to claim 1 wherein the amount of the second carbon material is at least 5 wt. % to up to 10 wt. % based on the combined amount of the first carbon material and the second carbon material.

9. A carbon material according to claim 1 wherein the second carbon material contains at least 0.01 wt. % to up to 3 wt. % of boron based on the combined amount of the first carbon material and the second carbon material.

10. A carbon material according to claim 1 wherein the second carbon material contains at least 0.25 wt. % to up to 1 wt. % of boron based on the combined amount of the first carbon material and the second carbon material.

11. A carbon material comprising a first carbon material serving as an inner core particle having an outer surface, and a coating of a second carbon material on said outer surface of the first carbon material, the second carbon material containing nitrogen and at least 1 wt. % to up to 15 wt. % of boron.

12. A carbon material according to claim 11 wherein the first carbon material contains no boron and no nitrogen.

13. A carbon material according to claim 11 wherein the first carbon material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method.

14. A carbon material according to claim 11 wherein the first carbon material is at least 3.35 Å to not greater than 3.36 Å in the spacing $d_{002}$ between (002) planes thereof and is at least 1000 Å in the size Lc of crystallites in the direction of c-axis thereof as determined by the X-ray wide-angle diffraction method.

15. A carbon material according to claim 11 wherein the second carbon material is at least 3.37 Å to not greater than 3.90 Å in the spacing $d_{002}$ between (002) planes thereof as determined by the X-ray wide-angle diffraction method.

16. A carbon material according to claim 11 wherein the second carbon material contains at least 5 wt. % to up to 10 wt. % of boron.

17. A carbon material according to claim 11 wherein the second carbon material contains at least 1 wt. % to up to 10 wt. % of nitrogen.

18. A carbon material according to claim 11 wherein the second carbon material contains at least 3 wt. % to up to 5 wt. % of nitrogen.

19. A carbon material according to claim 11 wherein the amount of the second carbon material is at least 1 wt. % to up to 20 wt. % based on the combined amount of the first carbon material and the second carbon material.

20. A carbon material according to claim 11 wherein the amount of the second carbon material is at least 5 wt. % to up to 15 wt. % based on the combined amount of the first carbon material and the second carbon material.

21. A carbon material according to claim 11 wherein the second carbon material contains at least 0.01 wt. % to up to 3 wt. % of boron based on the combined amount of the first carbon material and the second carbon material.

22. A carbon material according to claim 11 wherein the second carbon material contains at least 0.25 wt. % to up to 1.5 wt. % of boron based on the combined amount of the first carbon material and the second carbon material.

23. A carbon material according to claim 11 wherein the second carbon material contains at least 0.01 wt. % to up to 2 wt. % of nitrogen based on the combined amount of the first carbon material and the second carbon material.

24. A carbon material according to claim 11 wherein the second carbon material contains at least 0.15 wt. % to up to 0.75 wt. % of nitrogen based on the combined amount of the first carbon material and the second carbon material.

25. An electrode comprising a carbon material used as an active substance, the carbon material comprising a first carbon material serving as an inner core particle having an outer surface, and a coating of a second carbon material on said outer surface of the first carbon material, the second carbon material containing at least 1 wt. % to up to 15 wt. % of boron.

26. An electrode according to claim 25 wherein the first carbon material contains no boron.

27. An electrode according to claim 25 wherein the first carbon material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method.

28. An electrode according to claim 25 wherein the first carbon material is at least 3.35 Å to not greater than 3.36 Å in the spacing $d_{002}$ between (002) planes thereof and is at least 1000 Å in the size Lc of crystallites in the direction of c-axis thereof as determined by the X-ray wide-angle diffraction method.

29. An electrode according to claim 25 wherein the second carbon material is at least 3.37 Å to not greater than 3.90 Å in the spacing $d_{002}$ between (002) planes thereof as determined by the X-ray wide-angle diffraction method.

30. An electrode according to claim 25 wherein the second carbon material contains at least 5 wt. % to up to 10 wt. % of boron.

31. An electrode according to claim 25 wherein the amount of the second carbon material is at least 1 wt. % to up to 20 wt. % based on the combined amount of the first carbon material and the second carbon material.

32. An electrode according to claim 25 wherein the amount of the second carbon material is at least 5 wt. % to up to 10 wt. % based on the combined amount of the first carbon material and the second carbon material.

33. An electrode according to claim 25 wherein the second carbon material contains at least 0.01 wt. % to up to 3 wt. % of boron based on the combined amount of the first carbon material and the second carbon material.

34. An electrode according to claim 25 wherein the second carbon material contains at least 0.25 wt. % to up to 1 wt. % of boron based on the combined amount of the first carbon material and the second carbon material.

35. An electrode comprising a carbon material used as an active substance, the carbon material comprising a first carbon material serving as an inner core particle having an outer surface, and a coating of a second carbon material on said outer surface of the first carbon material, the second carbon material containing nitrogen and at least 1 wt. % to up to 15 wt. % of boron.

36. An electrode according to claim 35 wherein the first carbon material contains no boron and no nitrogen.

37. An electrode according to claim 35 wherein the first carbon material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method.

38. An electrode according to claim 35 wherein the first carbon material is at least 3.35 Å to not greater than 3.36 Å in the spacing $d_{002}$ between (002) planes thereof and is at least 1000 Å in the size Lc of crystallites in the direction of c-axis thereof as determined by the X-ray wide-angle diffraction method.

39. An electrode according to claim 35 wherein the second carbon material is at least 3.37 Å to not greater than 3.90 Å in the spacing $d_{002}$ between (002) planes thereof as determined by the X-ray wide-angle diffraction method.

40. An electrode according to claim 35 wherein the second carbon material contains at least 5 wt. % to up to 10 wt. % of boron.

41. An electrode according to claim 35 wherein the second carbon material contains at least 1 wt. % to up to 10 wt. % of nitrogen.

42. An electrode according to claim 35 wherein the second carbon material contains at least 3 wt. % to up to 5 wt. % of nitrogen.

43. An electrode according to claim 35 wherein the amount of the second carbon material is at least 1 wt. % to up to 20 wt. % based on the combined amount of the first carbon material and the second carbon material.

44. An electrode according to claim 35 wherein the amount of the second carbon material is at least 5 wt. % to up to 15 wt. % based on the combined amount of the first carbon material and the second carbon material.

45. An electrode according to claim 35 wherein the second carbon material contains at least 0.01 wt. % to up to 3 wt. % of boron based on the combined amount of the first carbon material and the second carbon material.

46. An electrode according to claim 35 wherein the second carbon material contains at least 0.25 wt. % to up to 1.5 wt. % of boron based on the combined amount of the first carbon material and the second carbon material.

47. An electrode according to claim 35 wherein the second carbon material contains 0.01 wt. % to up to 2 wt. % of nitrogen based on the combined amount of the first carbon material and the second carbon material.

48. An electrode according to claim 35 wherein the second carbon material contains at least 0.15 wt. % to up to 0.75 wt. % of nitrogen based on the combined amount of the first carbon material and the second carbon material.

49. A nonaqueous electrolyte secondary cell comprising a negative electrode incorporating a carbon material therein as an active substance, the carbon material comprising a first carbon material serving as an inner core particle having an outer surface, and a coating of a second carbon material on said outer surface of the first carbon material, the second carbon material containing at least 1 wt. % to up to 15 wt. % of boron.

50. A nonaqueous electrolyte secondary cell according to claim 49 wherein the first carbon material contains no boron.

51. A nonaqueous electrolyte secondary cell according to claim 49 wherein the first carbon material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method.

52. A nonaqueous electrolyte secondary cell according to claim 49 wherein the first carbon material is at least 3.35 Å to not greater than 3.36 Å in the spacing $d_{002}$ between (002) planes thereof and is at least 1000 Å in the size Lc of crystallites in the direction of c-axis thereof as determined by the X-ray wide-angle diffraction method.

53. A nonaqueous electrolyte secondary cell according to claim 49 wherein the second carbon material is at least 3.37 Å to not greater than 3.90 Å in the spacing $d_{002}$ between (002) planes thereof as determined by the X-ray wide-angle diffraction method.

54. A nonaqueous electrolyte secondary cell according to claim 49 wherein the second carbon material contains at least 5 wt. % to up to 10 wt. % of boron.

55. A nonaqueous electrolyte secondary cell according to claim 49 wherein the amount of the second carbon material is at least 1 wt. % to up to 20 wt. % based on the combined amount of the first carbon material and the second carbon material.

56. A nonaqueous electrolyte secondary cell according to claim 49 wherein the amount of the second carbon material is at least 5 wt. % to up to 10 wt. % based on the combined amount of the first carbon material and the second carbon material.

57. A nonaqueous electrolyte secondary cell according to claim 49 wherein the second carbon material contains at least 0.01 wt. % to up to 3 wt. % of boron based on the combined amount of the first carbon material and the second carbon material.

58. A nonaqueous electrolyte secondary cell according to claim 49 wherein the second carbon material contains at least 0.25 wt. % to up to 1 wt. % of boron based on the combined amount of the first carbon material and the second carbon material.

59. A nonaqueous electrolyte secondary cell according to claim 49 which comprises a positive electrode consisting mainly of a lithium-containing metal oxide.

60. A nonaqueous electrolyte secondary cell comprising a negative electrode incorporating a carbon material therein as an active substance, the carbon material comprising a first carbon material serving as an inner core particle having an outer surface, and a coating of a second carbon material on said outer surface of the first carbon material, the second carbon material containing nitrogen and at least 1 wt. % to up to 15 wt. % of boron.

61. A nonaqueous electrolyte secondary cell according to claim 60 wherein the first carbon material contains no boron and no nitrogen.

62. A nonaqueous electrolyte secondary cell according to claim 60 wherein the first carbon material is at least 3.35 Å to not greater than 3.38 Å in the spacing $d_{002}$ between (002) planes thereof and is at least 300 Å in the size Lc of crystallites in the direction of c-axis thereof as determined by the X-ray wide-angle diffraction method.

63. A nonaqueous electrolyte secondary cell according to claim 60 wherein the first carbon material is at least 3.35 Å to not greater than 3.36 Å in the spacing $d_{002}$ between (002) planes thereof and is at least 1000 Å in the size Lc of crystallites in the direction of c-axis thereof as determined by the X-ray wide-angle diffraction method.

64. A nonaqueous electrolyte secondary cell according to claim 60 wherein the second carbon material is at least 3.37 Å to not greater than 3.90 Å in the spacing $d_{002}$ between (002) planes thereof as determined by the X-ray wide-angle diffraction method.

65. A nonaqueous electrolyte secondary cell according to claim 60 wherein the second carbon material contains at least 5 wt. % to up to 10 wt. % of boron.

66. A nonaqueous electrolyte secondary cell according to claim 60 wherein the second carbon material contains at least 1 wt. % to up to 10 wt. % of nitrogen.

67. A nonaqueous electrolyte secondary cell according to claim 60 wherein the second carbon material contains at least 3 wt. % to up to 5 wt. % of nitrogen.

68. A nonaqueous electrolyte secondary cell according to claim 60 wherein the amount of the second carbon material is at least 1 wt. % to up to 20 wt. % based on the combined amount of the first carbon material and the second carbon material.

69. A nonaqueous electrolyte secondary cell according to claim 60 wherein the amount of the second carbon material is at least 5 wt. % to up to 15 wt. % based on the combined amount of the first carbon material and the second carbon material.

70. A nonaqueous electrolyte secondary cell according to claim 60 wherein the second carbon material contains at least 0.01 wt. % to up to 3 wt. % of boron based on the combined amount of the first carbon material and the second carbon material.

71. A nonaqueous electrolyte secondary cell according to claim 60 wherein the second carbon material contains at least 0.25 wt. % to up to 1.5 wt. % of boron based on the combined amount of the first carbon material and the second carbon material.

72. A nonaqueous electrolyte secondary cell according to claim 60 wherein the second carbon material contains at least 0.01 wt. % to up to 2 wt. % of nitrogen based on the combined amount of the first carbon material and the second carbon material.

73. A nonaqueous electrolyte secondary cell according to claim 60 wherein the second carbon material contains at least 0.15 wt. % to up to 0.75 wt. % of nitrogen based on the combined amount of the first carbon material and the second carbon material.

74. A nonaqueous electrolyte secondary cell according to claim 60 which comprises a positive electrode consisting mainly of a lithium-containing metal oxide.

\* \* \* \* \*